Figure 7:
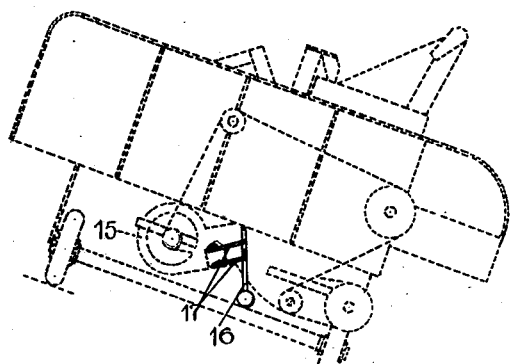

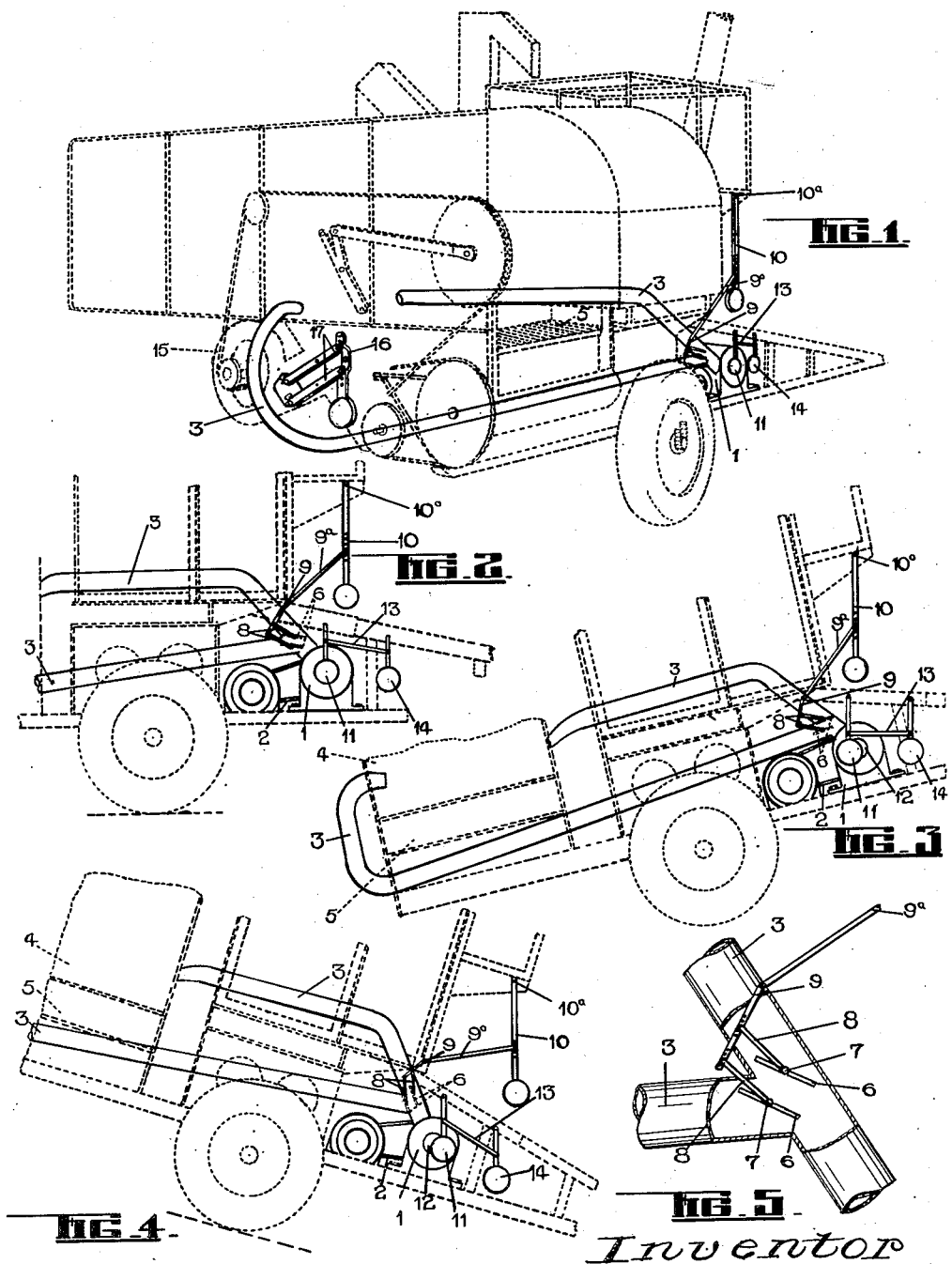

Sept. 23, 1952     H. J. STEVENSON     2,611,487
BLOWER AND AIR CONDUITS FOR COMBINES
Filed Aug. 28, 1947     2 SHEETS—SHEET 2

Inventor
H. J. Stevenson
By Stewart Dooring Diehle
Attys.

Patented Sept. 23, 1952

2,611,487

UNITED STATES PATENT OFFICE 2,611,487

BLOWER AND AIR CONDUITS FOR COMBINES

Henry John Stevenson, Weston, via Oamaru, New Zealand

Application August 28, 1947, Serial No. 771,007
In New Zealand May 13, 1946

Section 1, Public Law 690, August 8, 1946
Patent expires May 13, 1966

4 Claims. (Cl. 209—261)

The invention relates to harvesters adapted to cut and thresh a crop, following which the seeds or grain and the straw are delivered on to straw walkers, the seeds or grain falling through the straw walkers and passing to riddles for cleaning prior to collection and bagging, while the straw is delivered out on to the ground.

The riddles work in conjunction with an air blast from underneath, and effect the separation of the seeds or grain from the chaff.

It will be appreciated that when a harvester having the cleaning riddles disposed crossways thereof, travels up hill or down hill, or a harvester having the riddles disposed lengthways thereof, travels around sidlings, the seeds or grain owing to the inclination or slope of the ground, normally tend to roll or slide to the lowest point, and pile up at one side or the other of the riddles, and some seeds or grain are spilt on to the ground and lost.

Owing to the inability of the harvester to handle or distribute the seeds or grain evenly to the riddles under all conditions of travel, these machines are not used as much as they might be on hilly country, as although mechanical means consisting of a screw conveyor are known for spreading the seeds or grain over the riddles, said means have the disadvantage that on flat or level ground they have the tendency to drag the seeds or grain into the centres of the riddles, which is undesirable.

The invention aims at overcoming the inability or shortcoming of the harvester before referred to, by providing means which will, in an effective manner, prevent or minimise the piling of seeds or grain at one side of the riddles, due to the inclination or slope of the ground over which the machine travels, while at the same time said means will not interfere with the even distribution of seeds or grain over the riddles when the machine is travelling on flat or level ground, the means for ensuring the even distribution of the seeds or grain when the machine travels on inclined or sloping surfaces coming into operation only when and as required, to offset the effect of the inclined surface.

The invention may, therefore, be said to reside in the provision of improvements comprising means associated with cleaning riddles in a harvester, for controlling and directing streams or blasts of air at the back of the riddles to effect even spreading of the seeds or grain thereon, under conditions caused by the inclination or slope of the ground over which the machine travels, said means being brought into operation to perform their functions by the inclination or slope of the ground.

Briefly, the means comprise pendulum devices, and valves coupled together, with the valves set to control and direct air blasts to the cleaning riddles for the purpose of distributing seeds or grain thereon upon movement of the pendulum devices, caused by the harvester travelling over inclined or sloping ground.

In order, however, that the invention may be clearly understood, it will be more particularly described in conjunction with the accompanying drawings wherein Figure 1 is a part perspective view of a harvester (shown dotted), equipped with the improvements, Figure 2 a part side view showing the harvester (dotted) travelling on flat or level ground, Figures 3 and 4 part side views showing the harvester (dotted) travelling up hill and down hill respectively.

Figure 9:
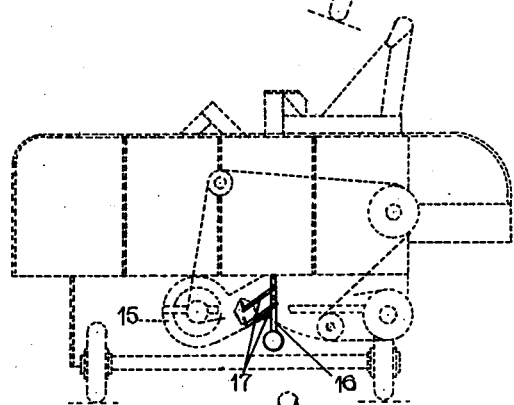
Figure 8:
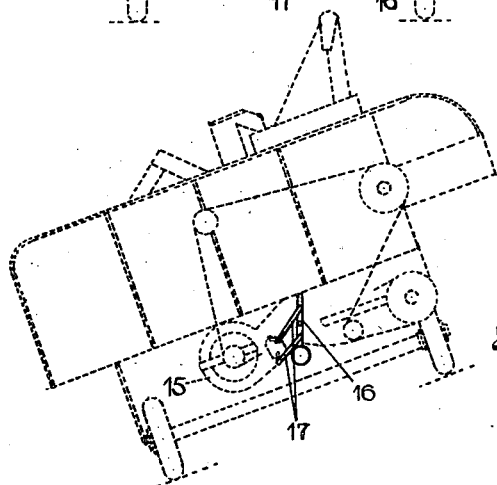
Figure 6:
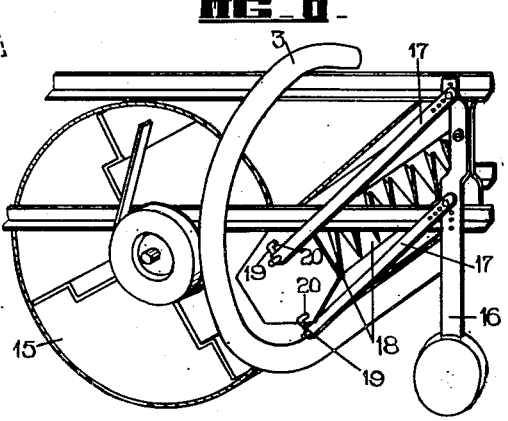

Figure 5 a detail view partly in section of a valve arrangement for directing a stream or blast of air to whichever is the lower side of the riddles, while Figure 6 is a part perspective view of a valve control arrangement for the main air blast, and Figures 7, 8 and 9 are rear views (dotted) illustrating the operation of the valve arrangement shown in Figure 6 for controlling the stream or blast of air from the main blast fan below the riddles when the machine travels with a sideways inclination, or along the flat.

In carrying out the invention, a blower 1 of suitable size is fitted to the harvester, and is driven through a belt drive 2 from any suitable part of the machine.

The delivery or outlet side of the blower 1 is connected with two pipes 3 which lead each to opposite sides of the compartment 4 of the harvester in which are the riddles 5, the latter in this case being disposed crossways of the machine.

The pipes 3 which may be galvanised iron down piping or flexible conduit of suitable diameter enter the compartment 4 through the sides thereof and behind the riddles 5 therein, and preferably have a downward bend at their terminal ends to discourage seeds or grain entering and rolling down the pipes, when no air blast is coming therefrom, said terminal ends also being tapered to a satisfactory outlet, and being located one at each side of the riddles 5.

A short distance from the outlet or delivery side of the blower 1, the pipes 3 are joined together so that the outlet or delivery side of the blower 1 is common to both pipes 3, and in the latter adjacent the junction thereof, are pivoted valves 6, one in respect of and each serving a pipe 3.

These valves 6 have on their spindles 7, arms 8 connected by rods 9 and 9a with a pendulum 10 freely suspended at 10a on the machine, so that swinging movement of the pendulum 10 is responsible for operation of the valves 6, which are set and coupled together and to the pendulum 10, so that when one valve 6 is moved to close the entrance to one pipe 3, the other valve 6 is moved to open the entrance to the other pipe 3, provision being made by means of series of holes in the arms 8 and rod 9 to enable the valves 6 to be set in correct relationship with each other and with the rod 9 and pendulum 10, to attain a desired result.

Thus, when the machine travels over an inclined or sloping surface which causes the riddles 5 to tilt or incline sideways, as for instance in the present case where the riddles 5 are disposed crossways of the machine, if the latter travels up hill or down hill, the pendulum 10, by its natural tendency to remain vertical, is responsible for the valves 6 being operated, so that one valve 6 closes the entrance to one pipe 3, while the other valve 6 opens the entrance to the other pipe 3, the setting of the valves 6 and their couplings being such that the pipe 3 serving the lower side of the riddles 5 is always opened to the air blast from the blower 1, while the pipe 3 which serves the upper side of the riddles 5 is cut off from the blower 1, with the result that with the riddles 5 tilted or inclined crossways, a blast of air is always delivered to the lower side of the riddles 5 to counteract or prevent the tendency of the seeds or grain to roll to and pile up at the lower side of the riddles 5, and thereby ensure their even distribution over the latter, and efficient sieving or cleaning.

As however, the blower 1 maintains an unvarying output, means are provided for varying the force of the air blast according to the angle of slope of the ground over which the machine is at the time travelling, and for ensuring that when there is no appreciable slope, there will be no air blast or blasts across the compartment 4 in which the riddles 5 are located, said means being as follows: a disc valve 11, slightly larger than the air admission port 12 in the housing of the blower 1, is hung so as to be capable of swinging across said port 12, and is connected by a link 13 to a pendulum 14 by which it is controlled in such a manner that when the machine is on level ground the disc valve 11 will hang so as to completely close the air admission port 12, thereby cutting off or preventing the creation of the blast by starving the blower of air. The link 13 is preferably adjustable as to length, and as to where it is connected to the disc valve 11 and the pendulum 14, so that the amount of leverage or "travel" of the valve 11 can be controlled for light or heavy seeds or grain (for example, with light seeds or grain less blast is required than with heavy seeds or grain, so that, on the same slope, the valve 11 will not need to admit as much air for them, as it would for heavy seeds or grain).

The efficiency of the blower 1 will determine the amount of air to be admitted, and the necessary adjustment can only be made as the result of experiments in the field.

When the machine operates on flat ground, the blower 1 can not produce any blast, as the disc valve 11 covers the air admission port 12 to the blower housing, and under these conditions the seeds or grain travel on to the riddles 5 in a thin even stream. When, on account of the inclination or slope of the ground, the conditions are such that with an existing harvester, seeds or grain will slide or roll so as to pile up at the low side of the riddles 5, travelling across the riddles in a heap—possibly four inches high—so that a proportion only of the seeds or grain would be extracted or riddled, the rest going on to the ground with the chaff and other foreign matter, in a harvester provided with the improvements herein described, the tendency for this to happen is counteracted at least to a substantial degree by the blower 1 coming into operation on the disc valve 11 so moving under the influence of the pendulum 14 to open the air admission port 12, while the other pendulum 10 actuates the valves 6 at the junction of the pipes 3. When this happens the disc valve 11 is open to a degree consistent with the angle of slope (the greater the slope the greater is the degree of opening), and the valves 6 direct the air blast to whichever is the lower side of the compartment 4. The air blast entering the compartment 4 disperses the heaps of seeds or grain just before they fall on to the riddles 5, and blows said seeds or grain back across the floor of the compartment 4 so that they come on to the riddles 5 substantially evenly across the whole width thereof, instead of in a thick heap. It is possible, by proper adjustment of the air blast to suit the weight of the seeds or grain, to ensure that the seeds or grain come on to the riddles about as evenly as on flat ground.

While the means already described take care of sideways inclination of the riddles as it affects the distribution of seeds or grain thereon, it is also necessary to provide means to take care of the inclination of the riddles 5 through their length, as it affects the distribution of seeds or grain thereon, and this is accomplished by providing for variation of the stream or blast of air from the main blower fan 15 to the riddles 5, according to whether the seeds or grain require to be caused to travel up hill, down hill, or horizontally along on the riddles 5, and according to the volume of the stream or blast of air required in effecting the separation of unwanted materials from the seeds or grain.

Variation of the stream or blast of air from the main blower fan 15, is effected by pendulum control means 16 which operate the valves 18 for regulating the stream or blast of air from the main blower fan 15 to the riddles 5, so that when the riddles 5 are horizontal through their length a stream or blast of air only sufficient for carrying the seeds or grain along on same, is passed to the riddles 5, but upon the latter being inclined through their length so that the seeds or grain require to travel up hill thereon, the stream or blast of air is increased, and should the riddles 5 be inclined through their length so that the seeds or grain require to travel down hill thereon, the stream or blast of air is decreased.

The last described arrangement provides for a variation of the stream or blast of air lengthways of the riddles 5 according to the work to be performed, and is an additional attachment which can be used in conjunction with self levelling riddles.

Also, this attachment can be fitted to any type of header riddle box with advantage, irrespective of whether the riddle box is self levelling or not.

The pendulum 16 can be hung from any suitable part of the machine, and be connected by means of a single or a plurality of connecting rods 17, with the valve or valves 18 to be operated, and in one suitable form the valves 18 can be of the interengaging saw tooth form with separate connecting rods 17 from opposite sides of the fulcrum of the pendulum 16 to cranks or arms 19 on the spindles 20 of the valves 18, the rods 17 being adjustable as to length, to suit varying conditions encountered.

What I do claim and desire to obtain by Letters Patent of the United States of America is:

1. In a blower system for a combine mounted on a wheeled frame and having at least one reciprocable cleaning riddle, air supply conduits disposed along the sides of the cleaning riddle at right angles to the longitudinal axis of the wheeled frame, valves positioned in said air supply conduits for controlling the passage of air therethrough, a pendulum mounted on said wheeled frame for oscillation parallel to the longitudinal axis of the latter, and links connecting said pendulum to said valves for opening and closing the latter to control the flow of air through said conduits in accordance with the tilting of the frame whereby the air blast from the respective conduit opposes the travel by gravity of the grain over the cleaning riddle.

2. In a blower system for a combine mounted on a wheeled frame and having at least one reciprocable cleaning riddle, air supply conduits disposed along the sides of the cleaning riddles at right angles to the longitudinal axis of the wheeled frame, valves positioned in said air supply conduits for controlling the passage of air therethrough, a blower for supplying air to said air conduits and having an inlet valve, a first pendulum mounted on said wheeled frame for oscillation parallel to the longitudinal axis of the latter, links connecting said first pendulum to said valves for opening and closing the latter in accordance with the tilting of the frame whereby the air blast from the respective conduit opposes the travel of the grain by gravity over the cleaning riddle, a second pendulum mounted on said wheeled frame for oscillation parallel to the longitudinal axis of the latter, and a link connecting said second pendulum to the inlet valve of the blower for closing the air intake of the blower when the wheeled frame is travelling on level ground.

3. In a blower system for a combine mounted on a wheeled frame and having at least one reciprocable cleaning riddle, air supply conduits disposed along the sides of the riddle at right angles to the axis of the longitudinal axis of the wheeled frame, valves positioned in said air supply conduits for controlling the passage of air therethrough, a pendulum mounted on said wheeled frame for oscillation parallel to the longitudinal axis of the latter, and links connecting said pendulum to said valves for directing an air blast along the cleaning riddle to oppose the travel of the grain by gravity along the latter due to the tilting of the wheeled frame and simultaneously closing the other valve.

4. In a blower system for a combine mounted on a wheeled frame and having at least one reciprocable cleaning riddle, air supply conduits disposed along the sides of the cleaning riddles at right angles to the longitudinal axis of the wheeled frame, valves positioned in said air supply conduits for controlling the passage of air therethrough, a blower for supplying air to said air conduits and having an inlet valve, a first pendulum mounted on said wheeled frame for oscillation parallel to the longitudinal axis of the latter, links connecting said first pendulum to said valves for opening one valve for directing an air blast along the cleaning riddle to oppose the travel of the grain by gravity along the latter due to tilting of the wheeled frame and simultaneously closing the other valve, a second pendulum mounted on said wheeled frame for oscillation parallel to the longitudinal axis of the latter, and a link connecting said second pendulum to the inlet valve of the blower for controlling the volume of air taken in by the blower in accordance with the tilting of the wheeled frame.

HENRY JOHN STEVENSON.

REFERENCES CITED

The following references are of record in the file of this patent:

UNITED STATES PATENTS

| Number | Name | Date |
|---|---|---|
| 356,967 | Scott | Feb. 1, 1887 |
| 509,082 | Heald | Nov. 21, 1893 |
| 871,743 | Tice | Nov. 19, 1907 |
| 885,215 | Amer | Apr. 21, 1908 |
| 1,035,631 | Okrassa | Aug. 13, 1912 |
| 1,122,803 | Rhodes | Dec. 29, 1914 |

FOREIGN PATENTS

| Number | Country | Date |
|---|---|---|
| 208,769 | Germany | June 25, 1917 |